F. SHEARER.
COMBINED HEATING AND COOKING APPARATUS.
APPLICATION FILED JULY 18, 1916.

1,236,990.

Patented Aug. 14, 1917.
2 SHEETS—SHEET 1.

WITNESSES:
Edwin H. Dieterich
Anna Ross

INVENTOR
BY Frederic Shearer
Conrad A. Dieterich
his ATTORNEY

F. SHEARER.
COMBINED HEATING AND COOKING APPARATUS.
APPLICATION FILED JULY 18, 1916.
1,236,990.
Patented Aug. 14, 1917.
2 SHEETS—SHEET 2.
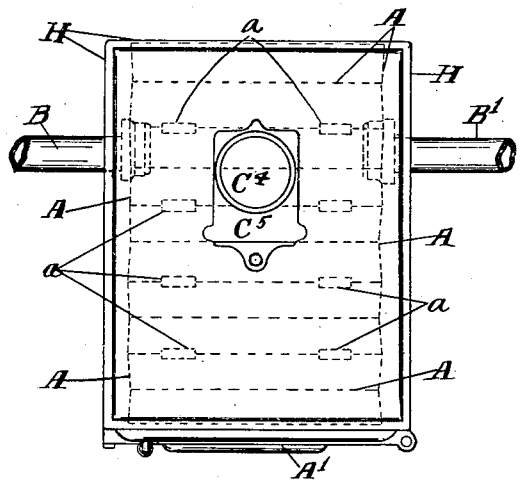
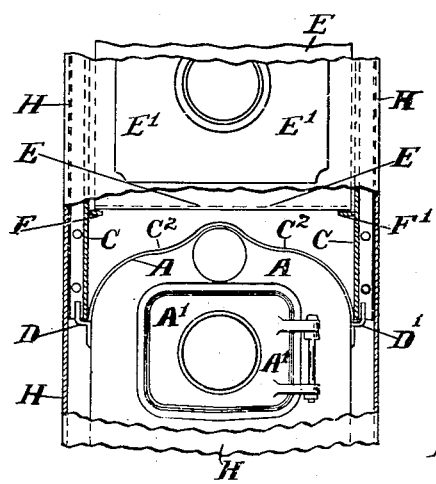
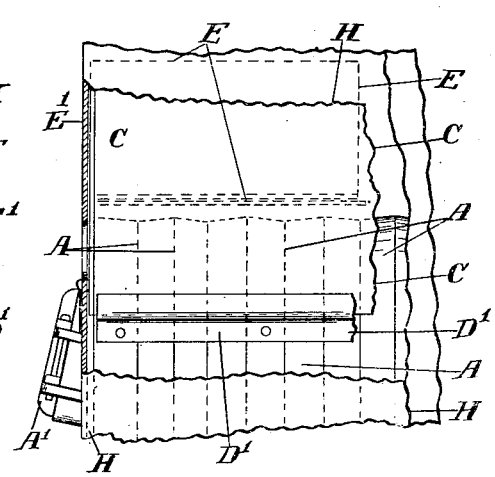
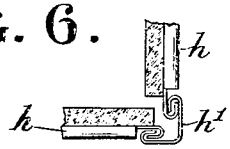
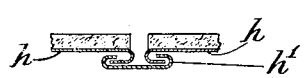
WITNESSES:
Edwin H. Dieterich.
Anna Ross.
INVENTOR
Frederic Shearer
BY Conrad A. Dieterich
ATTORNEY

UNITED STATES PATENT OFFICE.

FREDERIC SHEARER, OF LONDON, ENGLAND, ASSIGNOR TO AMERICAN RADIATOR COMPANY, OF CHICAGO, ILLINOIS, A CORPORATION OF NEW JERSEY.

COMBINED HEATING AND COOKING APPARATUS.

1,236,990.  Specification of Letters Patent.  Patented Aug. 14, 1917.

Application filed July 18, 1916. Serial No. 110,000.

*To all whom it may concern:*

Be it known that I, FREDERIC SHEARER, a citizen of the United States of America, but at present residing at London, England, have invented certain new and useful Improvements in Combined Heating and Cooking Apparatus; and I do hereby declare the following to be a full, clear, and exact description of the invention, such as will enable others skilled in the art to which it appertains to make and use the same.

This invention relates to improvements in combined heating and cooking apparatus of the type in which an oven or hot-plate is combined with a boiler for causing the circulation of water, the oven or hot-plate being mounted on the top of the boiler and being heated by the heat from the burning fuel in the grate of the boiler.

The present invention has for its object to provide a combined heating and cooking apparatus of the type referred to, wherein the boiler employed is of the sectional connected type, that is, built up of loop-like or similarly shaped tubular units or sections arranged side by side to produce the required length of boiler and so connected one to another that the water flows from one unit or section to another and so circulates throughout the whole length of the boiler and thence to radiators or the like for heating purposes, or through pipes for providing a domestic hot water supply, or for both such purposes, one grate only being employed, the gases from the fuel in such grate, which is arranged within the hollow interior of the group of connected units or sections, traveling through the longitudinal hollow interior of the group of connected units or sections. My said invention consists of the combination with such a sectional boiler, of an oven, and if desired, of a hot-plate or hood, and in inclosing the same by means of a jacket or casing.

In the accompanying drawings showing an illustrative embodiment of the invention—

Fig. 3 is a top view thereof;

Fig. 4 is a front view of a portion of the boiler and oven, parts being shown in section;

Fig. 5 is a side view of the portion shown in Fig. 4, parts being shown in section;

Fig. 6 is a detail view showing the manner of connecting the plates forming the corner of the jacket, and Fig. 7 is a detail view showing the manner of connecting the plates forming the side of the jacket.

Figs. 6 and 7 are drawn to a larger scale than the remainder of the figures.

Figure 1:
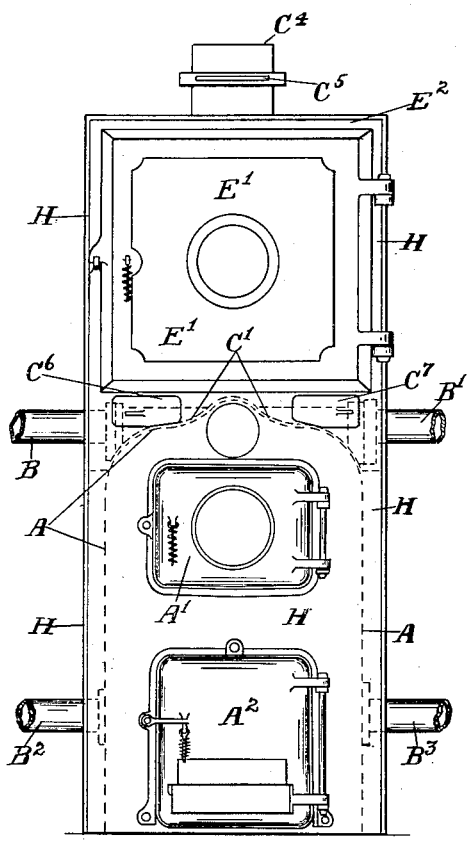
Figure 1 is a view in front elevation of a combined sectional boiler and cooking oven constructed according to and embodying my said invention.
Figure 2:
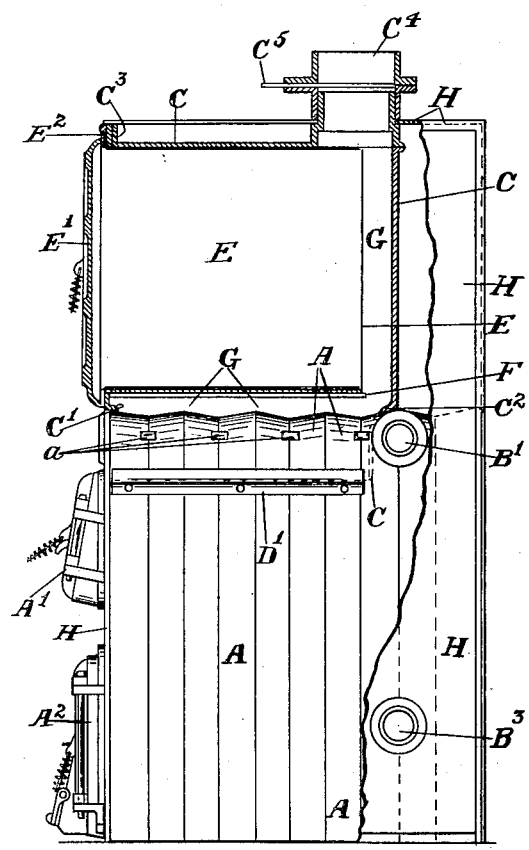
Fig. 2 is a side elevational view thereof, parts being shown in section.

Referring to the drawings, A indicates the boiler which is of the low-pressure type built up of units or sections through which the water to be heated circulates, $A^1$ being the door allowing of access to the fire-grate inclosed by the units or sections of the boiler, $A^2$ the door of the ash-pit, B and $B^1$ two flow pipes the one fitted to one side of the boiler and the other to the opposite side thereof; and $B^2$, $B^3$ are two return pipes similarly fitted one at each side of the boiler, all as heretofore.

By employing two flow pipes and two return pipes the water heated in the boiler can be employed both for heating purposes and for use for domestic purposes, the water for heating purposes being circulated through heating pipes or radiators with which one flow pipe and the corresponding return pipe are connected, the water for domestic use passing through suitable service pipes with which the second flow pipe and the corresponding return pipe are connected. In cases however where water is required for one only of the purposes mentioned, the boiler would be provided with one flow pipe and one return pipe only.

*a* indicates apertures in the top of the boiler for the gases from the fire in the grate of the boiler to pass through for heating the oven hereinafter referred to, said apertures being provided by cutting away or omitting a portion of the web of adjoining units or sections of which the boiler is built up.

C is a metal casing mounted on the top of the boiler A, the front and back portions of which casing rest on the top of the boiler as indicated at C¹ and C², the two side portions of the casing being deeper than the front portion and the back portion, thereby to project below the top of the boiler to a suitable extent, the bottom of one side portion resting in a longitudinal recess or in recesses formed by an angle shaped plate or plates or the equivalent D secured to one side of the boiler, the other side portion resting in a recess or recesses formed by a similarly shaped piece or pieces D¹ or the equivalent secured to the opposite side of the boiler.

E is an oven adapted to slide into and out of the casing C, the bottom of the oven resting on longitudinal ribs F, F¹ on the inside of the sides of the casing C, a space G intervening between the bottom of the oven and the top of the boiler and between the back of the oven and the back of the casing C, in which space the gases or heat from the boiler fire, which pass through the apertures a in the top of the boiler, circulate and act on the oven to heat the same.

The door E¹ of the oven is hinged to a frame E² which is bolted or otherwise secured to a flange C³ around the front of the casing C, the oven being adapted to be withdrawn from the casing when the bolts or securing means are removed.

The oven casing C is provided at the top, preferably at the back, with an outlet C⁴ to which is connected a pipe for the gases or fumes from the boiler, after they have acted on the oven, to escape through, said outlet being provided with a slide or damper C⁵ of any suitable type for closing the outlet or regulating the size of the opening as circumstances may render necessary. C⁶, C⁷ are two openings controlled by doors, slides or the like, in the front of the casing C, by means of which access can be had to the casing for the removal of soot or the like which may accumulate on the sides and back and bottom of the oven, the top of the boiler and on the inside of the casing.

The oven may extend over the full length of the boiler, or over a suitable portion only thereof, and when it extends over a portion only of the length of the boiler, a hot-plate or hood may be mounted on such portion of the boiler as is not occupied by the oven.

The boiler and oven are preferably inclosed within a non-conducting casing or jacket H, with the exception of the front or door portion of the oven, said casing or jacket being of that kind which consists of plates of sheet metal, sheet iron by preference, to the inside face of which is attached hair felt, asbestos cloth or like non-conducting material, the edges h of the metal plates being bent over the face of the plates to be of U, V or like shape in cross-section, adjoining plates being connected by slides or key-pieces in the form of metal strips h¹ which have their edges bent inwardly over the back or underside whereby they will engage the bent edges of the metal sheets, as shown more clearly at Figs. 6 and 7 of the drawings.

Portions of the front of the casing or jacket are removed at the points where the doors A¹ and A² of the boiler A are situated.

Having thus described my said invention, what I claim and desire to secure by Letters Patent is:—

1. A heating and cooking apparatus comprising a boiler provided with openings in its wall through which the products of combustion are adapted to pass, a casing supported directly upon said boiler and communicating with said openings, and an oven positioned within said casing, substantially as described.

2. A heating and cooking apparatus comprising a boiler provided with openings in its top wall through which the products of combustion are adapted to pass, a casing supported directly upon the top of said boiler and communicating with said openings, and an oven positioned within said casing, substantially as described.

3. A heating and cooking apparatus comprising a boiler provided with openings in its wall through which the products of combustion are adapted to pass, brackets secured to said boiler, a casing supported by said brackets and communicating with said openings, and an oven positioned within said casing, substantially as described.

4. A heating and cooking apparatus comprising a boiler provided with openings in its top wall through which the products of combustion are adapted to pass, brackets secured to the side walls of said boiler, a casing supported by said brackets and communicating with said openings, and an oven positioned within said casing, substantially as described.

5. A heating and cooking apparatus comprising a boiler provided with openings in its top wall through which the products of combustion are adapted to pass, brackets secured to the side walls of said boiler, a casing communicating with said openings, said casing having side walls resting upon said brackets and end walls resting upon the top wall of said boiler, and an oven positioned within said casing, substantially as described.

6. A heating and cooking apparatus comprising a boiler provided with openings in its top wall through which the products of combustion are adapted to pass, a casing supported directly upon the top of said boiler, said casing being free from a bottom wall whereby said openings will communicate with the interior of said casing, and an oven positioned within said casing, substantially as specified.

In testimony whereof I affix my signature in the presence of two witnesses.

FREDERIC SHEARER.

Witnesses:
 HENRY H. MOSS,
 CHARLES W. HETT.